(12) United States Patent
Gao et al.

(10) Patent No.: US 11,218,244 B2
(45) Date of Patent: Jan. 4, 2022

(54) INFORMATION TRANSMISSION METHOD AND APPARATUS

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 147 days.

(21) Appl. No.: 16/476,541

(22) PCT Filed: Feb. 11, 2018

(86) PCT No.: PCT/CN2018/076285
§ 371 (c)(1),
(2) Date: Jul. 8, 2019

(87) PCT Pub. No.: WO2018/127237
PCT Pub. Date: Jul. 12, 2018

(65) Prior Publication Data
US 2019/0327020 A1    Oct. 24, 2019

(30) Foreign Application Priority Data
Jan. 6, 2017 (CN) .......................... 201710011445.3

(51) Int. Cl.
*H04W 4/00* (2018.01)
*H04L 1/00* (2006.01)
(Continued)

(52) U.S. Cl.
CPC .......... *H04L 1/0013* (2013.01); *H04L 1/1816* (2013.01); *H04W 72/042* (2013.01); *H04W 72/0446* (2013.01); *H04W 72/1257* (2013.01)

(58) Field of Classification Search
None
See application file for complete search history.

(56) References Cited

U.S. PATENT DOCUMENTS

| 2013/0058291 A1* | 3/2013 | Ahn | H04L 5/0007 370/329 |
| 2013/0188532 A1* | 7/2013 | Zhang | H04B 7/2656 370/280 |

(Continued)

FOREIGN PATENT DOCUMENTS

| CN | 102064879 A | 5/2011 |
| CN | 102231662 A | 11/2011 |

(Continued)

*Primary Examiner* — Phirin Sam
(74) *Attorney, Agent, or Firm* — Kilpatrick Townsend & Stockton, LLP

(57) ABSTRACT

Disclosed in the embodiments of the present invention are an information transmission method and apparatus, the method comprising: a terminal receives indication information sent by a network device, the indication information being used for the terminal to determine an uplink area in a time unit in which an uplink shared channel is transmitted; the terminal sends the uplink shared channel in the uplink area; hence, the terminal receives the indication information sent by the network device and determines transmission resources for the uplink shared channel on the basis of the indication information, thus ensuring correct transmission of the uplink shared channel.

20 Claims, 4 Drawing Sheets

```
┌─ 201
│ The terminal receives indication information
│ sent by a network device, where the indication
│ information is used by the terminal to determine
│ an uplink region in a time unit for transmitting
│ an uplink shared channel
└
       │
       ▼
┌─ 202
│ The terminal transmits the uplink shared
│ channel in the uplink region
└
```

(51) Int. Cl.
*H04L 1/18* (2006.01)
*H04W 72/04* (2009.01)
*H04W 72/12* (2009.01)

(56) References Cited

U.S. PATENT DOCUMENTS

| | | | |
|---|---|---|---|
| 2016/0353453 A1* | 12/2016 | Au | H04L 5/0051 |
| 2017/0041907 A1* | 2/2017 | Seo | H04L 27/2601 |
| 2017/0338988 A1 | 11/2017 | Yin et al. | |
| 2019/0029052 A1* | 1/2019 | Yang | H04L 1/1861 |
| 2020/0163126 A1* | 5/2020 | Yang | H04L 5/0044 |

FOREIGN PATENT DOCUMENTS

| | | |
|---|---|---|
| CN | 103249153 A | 8/2013 |
| CN | 103326840 A | 9/2013 |
| CN | 104767594 A | 7/2015 |
| CN | 107294688 A | 10/2017 |
| WO | 2015006905 A1 | 1/2015 |
| WO | 2017134337 A1 | 8/2017 |

* cited by examiner

INFORMATION TRANSMISSION METHOD AND APPARATUS

This application is a National Stage of International Application No. PCT/CN2018/076285, filed Feb. 11, 2018, which claims priority to Chinese Patent Application No. 201710011445.3, filed Jan. 6, 2017, both of which are hereby incorporated by reference in their entireties.

FIELD

The present invention relates to the field of communications, and particularly to a method and device for transmitting information.

BACKGROUND

As there is an evolving demand for mobile communication services, the International Telecommunication Union (ITU), the 3$^{rd}$ Generation Partner Project (3GPP), and other organizations have come to conduct their researches on new wireless communication systems, e.g., a 5G system. The new wireless communication systems can support a number of coexisting types of services, e.g., an Ultra-Reliable and Low-Latency Communication (URLLC) service, an enhanced Mobile Broadband (eMBB) service, a massive Machine Type Communication (mMTC) service, etc., and there may be a varying amount of traffic of the same service.

Seven Time Division Duplex (TDD) uplink-downlink (UL-DL) configurations are defined for the TDD mode in the existing Long Term Evolution (LTE) system as depicted in Table 1.

TABLE 1

| Configuration | UL-DL configurations Sub-frame No. | | | | | | | | | |
|---|---|---|---|---|---|---|---|---|---|---|
| No. | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the LTE TDD system, each 10 ms radio frame includes two 5 ms half-frames, and each half-frame includes five sub-frames with a length of 1 ms. Sub-frames in a radio frame can be categorized into downlink, uplink, and special sub-frames. Each special sub-frame includes a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame.

In the LTE system, uplink and downlink resources are allocated as defined in the TDD frame structure above, so an LTE cell can be only configured with one TDD frame structure, and thus only a fixed uplink and downlink resource allocation can be supported, and notified via system information broadcasted in the cell, so the uplink and downlink resource allocation remains constant.

Moreover in the LTE system, a GP shall be arranged between uplink and downlink resources to avoid interference between the uplink and the downlink in the same cell, and to switch from the downlink to the uplink. The GP only exists in a special sub-frame in each TDD uplink-downlink configuration above, and the length of the GP depends upon a special sub-frame configuration corresponding to a length allocation of a DwPTS, an UpPTS, and a GP in the special sub-frame. The special sub-frame configuration is also notified via system information broadcasted in a cell, so the special sub-frame configuration also remains constant.

In summary, it is highly desirable in the art to provide a method for transmitting information so as to support information transmission of different types of services, and a flexible amount of traffic.

SUMMARY

Embodiments of the invention provide a method and device for transmitting information so as to support information transmission of different types of services, and a flexible amount of traffic.

In a first aspect, there is provided a method for transmitting information, the method including: receiving, by a terminal, indication information sent by a network device, where the indication information is used by the terminal to determine an uplink region in a time unit for transmitting an uplink shared channel; and transmitting, by the terminal, the uplink shared channel in the uplink region.

Optionally transmitting, by the terminal, the uplink shared channel in the uplink region includes: transmitting, by the terminal, the uplink shared channel in the uplink region according to the time-domain size of the uplink region, or the time-domain size of a preset region for transmitting data, in the uplink region; or transmitting, by the terminal, the uplink shared channel in the uplink region according to a first preset time-domain size.

Optionally transmitting, by the terminal, the uplink shared channel in the uplink region according to the time-domain size of the uplink region, or the time-domain size of the preset region for transmitting data, in the uplink region includes: encoding and/or rate-matching, by the terminal, data information transmitted in the uplink shared channel according to the time-domain size of the uplink region, and mapping the encoded and/or rate-matched data information into the uplink region for transmission; or encoding and/or rate-matching, by the terminal, data information transmitted in the uplink shared channel according to the time-domain size of the preset region, and mapping the encoded and/or rate-matched data information into the uplink region for transmission; or encoding and/or rate-matching, by the terminal, data information transmitted in the uplink shared channel according to a second preset time-domain size, and duplicating or truncating the encoded and/or rate-matched data information according to the time-domain size of the uplink region, and then mapping the duplicated or truncated data information into the uplink region for transmission; or encoding and/or rate-matching, by the terminal, data information transmitted in the uplink shared channel according to a second preset time-domain size, and duplicating or truncating the encoded and/or rate-matched data information according to the time-domain size of the preset region, and then mapping the duplicated or truncated data information into the preset region for transmission.

Optionally transmitting, by the terminal, the uplink shared channel in the uplink region according to the first preset time-domain size includes: encoding and/or rate-matching, by the terminal, data information transmitted in the uplink shared channel according to the first preset time-domain size; when the first preset time-domain size does not exceed the time-domain size of the uplink region, or the time-domain size of the preset region, mapping, by the terminal, the encoded and/or rate-matched data information onto a time-domain resource corresponding to the first preset time-domain size in the uplink region or in the preset region for transmission; and when the first preset time-domain size exceeds the time-domain size of the uplink region, truncating the encoded and/or rate-matched data information according to the time-domain size of the uplink region, and mapping the truncated data information into the uplink region for transmission, or dropping transmission of the uplink shared channel, or when the first preset time-domain size exceeds the time-domain size of the preset region, truncating the encoded and/or rate-matched data information according to the time-domain size of the preset region, and mapping the truncated data information into the preset region for transmission, or dropping transmission of the uplink shared channel.

Optionally receiving, by the terminal, the indication information sent by the network device includes: receiving, by the terminal, the indication information in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel; or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally the method further includes: when the terminal does not receive the indication information, or fails to receive the indication information, performing, by the terminal, no uplink transmission in the time unit, or transmitting, by the terminal, the uplink shared channel according to a preset or preconfigured size and/or position of time resource in the time unit; or when the terminal determines according to the indication information that the time unit for transmitting the uplink shared channel is all-downlink, dropping, by the terminal, the current transmission.

Optionally transmitting, by the terminal, the uplink shared channel in the uplink region includes: when the terminal determines according to the indication information that the time unit for transmitting the uplink shared channel includes a downlink region and an uplink region, and a time unit after the time unit for transmitting the uplink shared channel is all-uplink, transmitting, by the terminal, uplink shared channels separately in the time unit for transmitting the uplink shared channel, and the time unit after the time unit for transmitting the uplink shared channel respectively, or transmitting one uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of: a grant-free uplink shared channel; a semi-persistently scheduled uplink shared channel; and an uplink shared channel triggered by a Physical Hybrid Automatic Repeat Request (ARQ) Indicator Channel (PHICH) to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

In a second aspect, there is provided another method for transmitting information, the method including: sending, by a network device, indication information to a terminal, where the indication information is used by the terminal to determine an uplink region in a time unit for transmitting an uplink shared channel; and receiving, by the network device, the uplink shared channel transmitted by the terminal, in the uplink region.

Optionally receiving, by the network device, the uplink shared channel transmitted by the terminal, in the uplink region includes: receiving, by the network device, the uplink shared channel in the uplink region according to the time-domain size of the uplink region, or the time-domain size of a preset region for transmitting data, in the uplink region; or receiving, by the network device, the uplink shared channel in the uplink region according to a first preset time-domain size.

In one embodiment, receiving, by the network device, the uplink shared channel in the uplink region according to the time-domain size of the uplink region, or the time-domain size of the preset region for transmitting data, in the uplink region includes: channel-decoding and/or rate-dematching, by the network device, data information transmitted in the uplink shared channel, according to the time-domain size of the uplink region; or channel-decoding and/or rate-dematching, by the network device, data information transmitted in the uplink shared channel, according to the time-domain size of the preset region; or determining, by the network device, according to a second preset time-domain size, and the time-domain size of the uplink region, or the second preset time-domain size, and the time-domain size of the preset region that encoded and/or rate-matched data information is duplicated or truncated by the terminal, and then merging duplicated parts of the data information transmitted in the uplink shared channel, or supplementing bits in a truncated part thereof, and channel-decoding and/or rate-dematching the merged data information or the supplemented data information according to the second preset time-domain size.

Optionally receiving, by the network device, the uplink shared channel in the uplink region according to the first preset time-domain size includes: when the first preset time-domain size does not exceed the time-domain size of the uplink region, or the time-domain size of the preset region, receiving, by the network device, the uplink shared channel over a time-domain resource corresponding to the first preset time-domain size in the uplink region or the preset region, and channel-decoding and/or rate-dematching data information transmitted in the uplink shared channel according to the first preset time-domain size; and when the first preset time-domain size exceeds the time-domain size of the uplink region, or the time-domain size of the preset region, receiving, by the network device, the uplink shared channel in all the symbols occupied by the uplink region or the preset region, supplementing bits of data information transmitted in the uplink shared channel, and then channel-decoding and/or rate-dematching the supplemented data information according to the first preset time-domain size.

Optionally sending, by the network device, the indication information to the terminal includes: sending, by the network device, the indication information to the terminal in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel; or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally the method further includes: when the network device does not send the indication information, or fails to send the indication information, receiving, by the network device, no uplink transmission in the time unit, or receiving, by the network device, the uplink shared channel according to a preset or preconfigured size and/or position of time resource in the time unit; or when the time unit for transmitting the uplink shared channel is all-downlink, receiving, by the network device, no uplink transmission.

Optionally receiving, by the network device, the uplink shared channel transmitted by the terminal includes: when the time unit for transmitting the uplink shared channel includes a downlink region and an uplink region, and a time unit after the time unit for transmitting the uplink shared channel is all-uplink, receiving, by the network device, separately transmitted uplink shared channels respectively in the time unit for transmitting the uplink shared channel, and the time unit after the time unit for transmitting the uplink shared channel, or receiving one uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of: a grant-free uplink shared channel; a semi-persistently scheduled uplink shared channel; and an uplink shared channel triggered by a Physical Hybrid Automatic Repeat Request (ARQ) Indicator Channel (PHICH) to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

In a third aspect, there is provided a terminal including: a receiving unit and a transmitting unit, where the receiving unit is configured to receive indication information sent by a network device, where the indication information is used by the terminal to determine an uplink region in a time unit for transmitting an uplink shared channel; and the transmitting unit is configured to transmit the uplink shared channel in the uplink region.

Optionally the transmitting unit is configured: to transmit the uplink shared channel in the uplink region according to the time-domain size of the uplink region, or the time-domain size of a preset region for transmitting data, in the uplink region; or to transmit the uplink shared channel in the uplink region according to a first preset time-domain size.

Optionally the transmitting unit configured to transmit the uplink shared channel in the uplink region according to the time-domain size of the uplink region, or the time-domain size of the preset region for transmitting data, in the uplink region is configured: to encode and/or rate-match data information transmitted in the uplink shared channel according to the time-domain size of the uplink region, and to map the encoded and/or rate-matched data information into the uplink region for transmission; or to encode and/or rate-match data information transmitted in the uplink shared channel according to the time-domain size of the preset region, and to map the encoded and/or rate-matched data information into the uplink region for transmission; or to encode and/or rate-match data information transmitted in the uplink shared channel according to a second preset time-domain size, and to duplicate or truncate the encoded and/or rate-matched data information according to the time-domain size of the uplink region, and then map the duplicated or truncated data information into the uplink region for transmission; or to encode and/or rate-match data information transmitted in the uplink shared channel according to a second preset time-domain size, and to duplicate or truncate the encoded and/or rate-matched data information according to the time-domain size of the preset region, and then map the duplicated or truncated data information into the preset region for transmission.

Optionally the transmitting unit configured to transmit the uplink shared channel in the uplink region according to the first preset time-domain size is configured: to encode and/or rate-match data information transmitted in the uplink shared channel according to the first preset time-domain size; when the first preset time-domain size does not exceed the time-domain size of the uplink region, or the time-domain size of the preset region, to map the encoded and/or rate-matched data information onto a time-domain resource corresponding to the first preset time-domain size in the uplink region or in the preset region for transmission; and when the first preset time-domain size exceeds the time-domain size of the uplink region, to truncate the encoded and/or rate-matched data information according to the time-domain size of the uplink region, and to map the truncated data information into the uplink region for transmission, or to drop transmission of the uplink shared channel, or when the first preset time-domain size exceeds the time-domain size of the preset region, to truncate the encoded and/or rate-matched data information according to the time-domain size of the preset region, and to map the truncated data information into the preset region for transmission, or to drop transmission of the uplink shared channel.

Optionally the receiving unit configured to receive the indication information sent by the network device is configured: to receive the indication information in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel; or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally the transmitting unit is further configured: when the receiving unit does not receive the indication information, or fails to receive the indication information, to perform no uplink transmission in the time unit, or to transmit the uplink shared channel according to a preset or preconfigured size and/or position of time resource in the time unit; or when the receiving unit determines according to the indication information that the time unit for transmitting the uplink shared channel is all-downlink, to drop the current transmission.

Optionally the transmitting unit is configured: when the receiving unit determines according to the indication information that the time unit for transmitting the uplink shared channel includes a downlink region and an uplink region, and a time unit after the time unit for transmitting the uplink shared channel is all-uplink, to transmit uplink shared channels separately in the time unit for transmitting the uplink shared channel, and the time unit after the time unit for transmitting the uplink shared channel respectively, or to transmit one uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of: a grant-free uplink shared channel; a semi-persistently scheduled uplink shared channel; and an uplink shared channel triggered by a Physical Hybrid Automatic Repeat Request (ARQ) Indicator Channel (PHICH) to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

In a fourth aspect, there is provided a network device including: a sending unit and a receiving unit, where the sending unit is configured to send indication information to a terminal, where the indication information is used by the terminal to determine an uplink region in a time unit for transmitting an uplink shared channel; and the receiving unit is configured to receive the uplink shared channel transmitted by the terminal, in the uplink region.

Optionally the receiving unit configured to receive the uplink shared channel transmitted by the terminal, in the uplink region is configured: to receive the uplink shared channel in the uplink region according to the time-domain size of the uplink region, or the time-domain size of a preset region for transmitting data, in the uplink region; or to receive the uplink shared channel in the uplink region according to a first preset time-domain size.

In one embodiment, the receiving unit configured to receive the uplink shared channel in the uplink region according to the time-domain size of the uplink region, or the time-domain size of the preset region for transmitting data, in the uplink region is configured: to channel-decode and/or rate-dematch data information transmitted in the uplink shared channel, according to the time-domain size of the uplink region; or to channel-decode and/or rate-dematch data information transmitted in the uplink shared channel, according to the time-domain size of the preset region; or to determine according to a second preset time-domain size, and the time-domain size of the uplink region, or the second preset time-domain size, and the time-domain size of the preset region that encoded and/or rate-matched data information is duplicated or truncated by the terminal, to merge duplicated parts of the data information transmitted in the uplink shared channel, or to supplement bits in a truncated part thereof, and to channel-decode and/or rate-dematch the merged data information or the supplemented data information according to the second preset time-domain size.

Optionally the receiving unit configured to receive the uplink shared channel in the uplink region according to the first preset time-domain size is configured: when the first preset time-domain size does not exceed the time-domain size of the uplink region, or the time-domain size of the preset region, to receive the uplink shared channel over a time-domain resource corresponding to the first preset time-domain size in the uplink region or the preset region, and to channel-decode and/or rate-dematch data information transmitted in the uplink shared channel according to the first preset time-domain size; and when the first preset time-domain size exceeds the time-domain size of the uplink region, or the time-domain size of the preset region, to receive the uplink shared channel in all the symbols occupied by the uplink region or the preset region, to supplement bits of data information transmitted in the uplink shared channel, and to channel-decode and/or rate-dematch the supplemented data information according to the first preset time-domain size.

Optionally the sending unit configured to send the indication information to the terminal is configured: to send the indication information to the terminal in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel; or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally the receiving unit is further configured: when the sending unit does not send the indication information, or fails to send the indication information, to receive no uplink transmission in the time unit, or to receive the uplink shared channel according to a preset or preconfigured size and/or position of time resource in the time unit; or when the time unit for transmitting the uplink shared channel is all-downlink, to receive no uplink transmission.

Optionally the receiving unit is configured: when the time unit for transmitting the uplink shared channel includes a downlink region and an uplink region, and a time unit after the time unit for transmitting the uplink shared channel is all-uplink, to receive separately transmitted uplink shared channels respectively in the time unit for transmitting the uplink shared channel, and the time unit after the time unit for transmitting the uplink shared channel, or to receive one uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of: a grant-free uplink shared channel; a semi-persistently scheduled uplink shared channel; and an uplink shared channel triggered by a Physical Hybrid Automatic Repeat Request (ARQ) Indicator Channel (PHICH) to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

In a fifth aspect, there is provided a device including: a processor, a transceiver, and a memory, where the transceiver is configured to transmit and receive data under the control of the processor, and the processor is configured to read and execute program in the memory to perform the method according to any one of the solutions in the first aspect above.

In a sixth aspect, there is provided a device including: a processor, a transceiver, and a memory, where the transceiver is configured to transmit and receive data under the control of the processor, and the processor is configured to read and execute program in the memory to perform the method according to any one of the solutions in the second aspect above.

In a seventh aspect, there is provided a computer storage medium storing computer executable instructions configured to cause the computer to perform the method according to any one of the solutions in the first aspect above.

In an eighth aspect, there is provided a computer storage medium storing computer executable instructions configured to cause the computer to perform the method according to any one of the solutions in the second aspect above.

In the embodiments above of the invention, a terminal receives indication information sent by a network device, where the indication information is used by the terminal to determine an uplink region in a time unit for transmitting an uplink shared channel; and the terminal transmits the uplink shared channel in the uplink region. Apparently the terminal receives the indication information sent by the network device, and determines a transmission resource of the uplink shared channel according to the indication information, so that the uplink shared channel can be transmitted correctly.

BRIEF DESCRIPTION OF THE DRAWINGS

In order to make the technical solutions according to the embodiments of the invention more apparent, the drawings to which reference is to be made in the description of the embodiments will be introduced below in brief, and apparently the embodiments to be described below illustrate only a part but not all of the embodiments of the invention. Those ordinarily skilled in the art can further derive other drawings from these drawings without any inventive effort.

DETAILED DESCRIPTION OF THE EMBODIMENTS

In order to make the objects, technical solutions, and advantages of the invention more apparent, the invention will be described below in further details with reference to the drawings.

The terms "first", "second", etc., in the description, the claims, and the drawings above of the invention are intended to distinguish different objects from each other, but not to define any specific order thereof. Moreover the terms "include", "comprise", and any variants thereof are intended to comprehend nonexclusive inclusion. For example, a process, a method, a system, a product, or a device, including a series of steps or elements will not be limited to the listed steps or elements, but can optionally further include a step or steps or an element or elements which is or are not listed, or another step or steps or element or elements inherent to the process, the method, the product, or the device.

Figure 1:
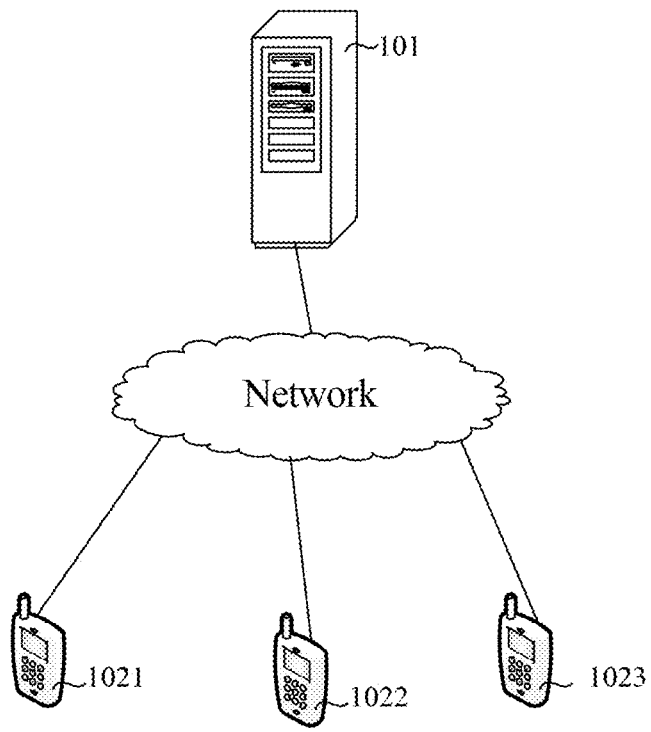
FIG. 1 is a schematic diagram of a system architecture to which the embodiments of the invention are applicable.

A method for transmitting information according to an embodiment of the invention can be applicable to various system architectures. FIG. 1 is a schematic diagram of a system architecture to which the embodiment of the invention is applicable. As illustrated in FIG. 1, the system architecture includes a network device 101 and one or more terminals, e.g., a first terminal 1021, a second terminal 1022, and a third terminal 1023 as illustrated in FIG. 1. The network device 101 can transmit information with the first terminal 1021, the second terminal 1022, and the third terminal 1023 over a network.

In the embodiment of the invention, the network device can be a Base Station (BS) device. The base station device, also referred to as a base station, is a device deployed in a radio access network to provide a radio communication function. For example, a device functioning as a base station in a 2G network includes a Base Transceiver Station (BTS) and a Base Station Controller (BSC), a device functioning as a base station in a 3G network includes a Node B and a Radio network Controller (RNC), a device functioning as a base station in a 4G network includes an evolved Node B (eNB), a device functioning as a base station in a 5G network includes a new radio Node B (gNB), a Centralized Unit (CU), a distributed unit (DU), and a new radio controller, and a device functioning as a base station in a WLAN is an Access Point (AP).

The terminal can be a device providing a user with voice and/or data connectivity. The terminal includes a wired terminal and a wireless terminal. The wireless terminal can be a handheld device with a wireless connection function, or another processing device connected with a wireless modem, or a mobile terminal communicating with one or more core networks over a radio access network. For example, the wireless terminal can be a mobile phone, a computer, a tablet computer, a Personal Digital Assistant (PDA), a Mobile Internet Device (MID), a wearable device, an electronic book (e-book) reader, etc. In another example, the wireless terminal can be a portable, pocket, handheld, in-computer, or on-vehicle mobile device. In still another example, the wireless terminal can be a part of a mobile station, an access point, or a User Equipment (UE).

Communication systems to which the system architecture above include but will not be limited to a Time Division Duplexing-Long Term Evolution (TDD LTE) system, a Long Term Evolution-Advanced (LTE-A) system, and various future evolved wireless communication systems (e.g., a 5G system).

Taking a 5G system (also referred to as a new RAT system) as an example, particularly new types of services including a URLLC service, an eMBB service, and an mMTC service are defined in the 5G system, and there is also a varying amount of traffic of the same service. In order to support different types of service, and a flexible amount of traffic, all-downlink slots, transmission structures including all-uplink slots, both downlink and uplink slots, etc., can be applied, so the embodiments of the invention provide a method for transmitting information in a varying slot structure.

Figure 2:
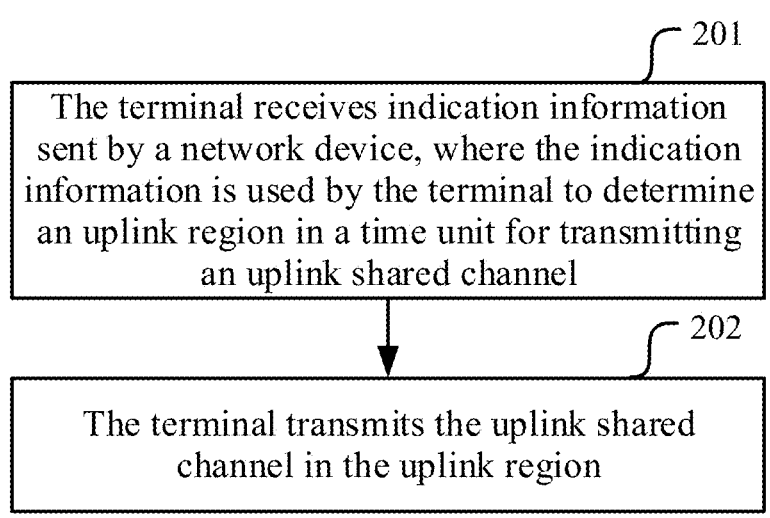
FIG. 2 is a schematic flow chart of a method for transmitting information according to a first embodiment of the invention.

FIG. 2 illustrates a schematic flow chart of a method for transmitting information according to an embodiment of the invention. As illustrated in FIG. 2, the method at a terminal includes the following operations.

In the operation 201, the terminal receives indication information sent by a network device, where the indication information is used by the terminal to determine an uplink region in a time unit for transmitting an uplink shared channel.

In the operation 202, the terminal transmits the uplink shared channel in the uplink region.

In the embodiment of the invention, the terminal receives the indication information sent by the network device, and determines a transmission resource of the uplink shared channel according to the indication information, so that the uplink shared channel can be transmitted correctly.

In the embodiment of the invention, the uplink shared channel can be an uplink shared channel without any corresponding scheduling signaling, and particularly can include one or more of a grant-free uplink shared channel, a semi-persistently scheduled uplink shared channel, and an uplink shared channel triggered by a Physical Hybrid Automatic Repeat Request (ARQ) Indicator Channel (PHICH) to be retransmitted.

As grant-free uplink transmission refers, uplink transmission of terminals is not scheduled by dynamic and explicit scheduling signaling of the network side, and the terminals can share the same time and/or frequency resource. At this time, a time transmission periodicity or a time transmission instance of time may or may not be specified, and if it is not specified, a terminal with uplink data to be transmitted can decide itself to transmit the uplink data over a time and/or frequency resource configured for the terminal in any one time unit including an uplink region.

The time unit is defined as a unit including D1 number of sub-frames or D2 number of slots or D3 number of mini-slots or D4 number of symbols, where D1, D2, D3, and D4 are integers more than or equal to 1.

Particularly in the operation 201, the terminal can receive the indication information in the time unit for transmitting the uplink shared channel, or a time unit before the time unit for transmitting the uplink shared channel. Stated otherwise, the network device sends the indication information at a specific time-frequency position in the time unit for transmitting the uplink shared channel, or the network device sends the indication information at a specific time-frequency position in the time unit before the time unit for transmitting the uplink shared channel.

The indication information can be carried in higher-layer signaling, or carried in a broadcast channel, or carried in a downlink control channel. The downlink control channel can be a downlink control channel in an uplink DCI format, or a downlink control channel in a downlink DCI format, or a downlink control channel in a dedicated DCI format for carrying indication information. The indication information is terminal-specific, or shared among terminals.

The indication information can indicate a time-domain size and/or a time position of the uplink region in the time unit for transmitting the uplink shared channel.

The indication information can alternatively indicate an allocation of uplink and downlink resources in the time unit for transmitting the uplink shared channel, where the allocation of uplink and downlink resources particularly includes at least two of a downlink resource, an uplink resource, and a Guard Period (GP) resource, where the downlink resource includes a size and/or a position of a downlink region, the uplink resource includes a size and/or a position of the uplink region, and the GP resource includes a size and/or a position of a GP; or the allocation of uplink and downlink resources particularly includes an uplink-downlink structure type in the time unit for transmitting the uplink shared channel, and the uplink-downlink structure type is at least one of all-uplink, all-downlink, and uplink-and-downlink structure types.

Here the all-uplink structure type refers to a structure type in which all the symbols in the time unit are uplink symbols; the all-downlink structure type refers to a structure type in which all the symbols in the time unit are downlink symbols; and the uplink-and-downlink structure type refers to a structure type in which a part of symbols in the time unit are uplink symbols, a part thereof are downlink symbols, and the remaining symbols are GPs.

The uplink-and-downlink structure type can further include uplink-majority (i.e., the majority of symbols in the time unit are uplink symbols) and downlink-majority (i.e., the majority of symbols in the time unit are downlink symbols) structure types.

By way of an example, the indication information indicates that the time unit includes one of all-uplink or all-downlink or uplink-and-downlink structure types, where a plurality of uplink-and-downlink structure types can be predefined or configured, and each structure type corresponds to a different uplink-downlink allocation proportion (i.e., it includes a different number of uplink symbols, and a different number of downlink symbols), or an uplink-downlink allocation proportion in the uplink-and-downlink structure type can be adjusted dynamically (for example, the size of a GP can be determined dynamically according to interference between adjacent cells, a TA demand, etc., to thereby adjust dynamically the size of an uplink region and/or a downlink region).

In another example, the indication information indicates that the time unit includes one of a plurality of predefined or preconfigured uplink-and-downlink structure types, where each of the plurality of predefined or preconfigured uplink-and-downlink structure types corresponds to a different uplink-downlink allocation proportion (that is, it includes a different number of uplink symbols, and a different number of downlink symbols).

In still another example, the indicate information indicates that the time unit includes one of all-uplink or all-downlink or uplink-majority or downlink-majority structure types, where a plurality of uplink-majority and/or downlink-majority structure types can be predefined or preconfigured, and each structure type corresponds to a different uplink-downlink allocation proportion (that is, it includes a different number of uplink symbols, and a different number of downlink symbols).

When the terminal determines that the time unit for transmitting the uplink shared channel is all-downlink, according to the indication information, the terminal drops the current transmission. For example, for a Semi-Persistently Scheduled (SPS) uplink shared channel, when a time unit for transmitting the SPS uplink shared channel, determined according to a pre-configured transmission periodicity of the SPS uplink shared channel is all-downlink, the SPS uplink shared channel is not transmitted. In another example, for PHICH triggered uplink shared channel retransmission, when a time unit for transmitting the PHICH triggered uplink shared channel, determined according to the PHICH and a retransmission timing definition of the corresponding uplink shared channel, is all-downlink, the PHICH triggered uplink shared channel is not transmitted.

When the terminal does not detect the indication information for determining the uplink region in the time unit for transmitting the uplink shared channel, or fails to detect the indication information (for example, a Cyclic Redundancy code (CRC) check is not passed), the terminal does not perform any uplink transmission in the time unit, or the terminal transmits the uplink shared channel according to a preset or preconfigured size and/or position of time resource in the time unit (at this time, the time unit always includes an uplink region by default, so this will not apply if the time unit is all-downlink). The preset or preconfigured size and/or position of time resource can be represented as A number of symbols or B number of mini-slots, and the preset or preconfigured time position can be represented as the last A number of symbols or B number of mini-slots in a time unit, and for example, a preset or preconfigured time resource includes the last two symbols or the last mini-slot in a time unit.

When the terminal determines that the time unit for transmitting the uplink shared channel is all-downlink, according to the indication information, the terminal drops the current transmission.

When the terminal determines that the time unit for transmitting the uplink shared channel includes a downlink region and an uplink region, and a time unit after the time unit for transmitting the uplink shared channel is all-uplink, according to the indication information, the terminal transmits uplink shared channels separately in the time unit for transmitting the uplink shared channel, and the time unit after the time unit for transmitting the uplink shared channel respectively (that is, an uplink shared channel is transmitted in only one of the time units instead of being transmitted across the two time units), or transmits an uplink shared channel in the time unit for transmitting the uplink shared channel, and the time unit after the time unit for transmitting the uplink shared channel (that is, an uplink shared channel is transmitted across the two time units), according to a prescription or a configuration.

Stated otherwise, the time unit for transmitting the uplink shared channel can include one time unit or a plurality of consecutive time units. If the time unit for transmitting the uplink shared channel includes a plurality of time units, the uplink region will include all the uplink regions in the plurality of time units, and before this, the terminal receives the indication information, and determines the uplink regions in the time units for transmitting the uplink shared channel, according to the indication information.

By way of an example, when the terminal determines that the i-th time unit includes a downlink region and an uplink region, and the (i+1)-th time unit is all-uplink, according to the indication information, the terminal can transmit two uplink shared channels respectively in the i-th time unit and the (i+1)-th time unit (that is, an uplink shared channel is transmitted in only one of the time units instead of being transmitted across the two time units), or a uplink resource in the i-th time unit and a uplink resource in the (i+1)-th time unit are combined to transmit one uplink shared channel (that is, one uplink shared channel is transmitted across the two time units), according to a prescription or a configuration.

The terminal transmits an uplink shared channel in the uplink region in two implementations which will be described below respectively.

(1) First Implementation.

The terminal transmits an uplink data channel without any corresponding scheduling signaling according to the time-domain size of an uplink region in a time unit for transmitting the uplink shared channel, or the time-domain size of a preset region for transmitting data, in the uplink region, where the preset region for transmitting data, in the uplink region can be a preset or preconfigured region for transmitting data, in the uplink region.

In a particular implementation, in a possible implementation, the terminal decodes and/or rate-matches data information transmitted in the uplink shared channel, according to the time-domain size of the uplink region, and maps the decoded and/or rate-matched data information into the uplink region for transmission; or the terminal decodes and/or rate-matches data information transmitted in the uplink shared channel, according to the time-domain size of the preset region, and maps the decoded and/or rate-matched data information into the preset region for transmission.

Stated otherwise, the terminal decodes and/or rate-matches the data information (regardless of initial transmission or retransmission) so that all the symbols in the uplink region, or all the symbols in the preset or preconfigured region for transmitting data, in the uplink region are used for transmitting the uplink shared channel.

In the embodiment of the invention, the symbols include but will not be limited to Orthogonal Frequency Division Multiplexing (OFDM) symbols, Sparse Code Multiplexing Access (SCMA) symbols, Filtered Orthogonal Frequency Division Multiplexing (F-OFDM) symbols, Non-Orthogonal Multiple Access (NOMA) symbols, Single-Carrier Frequency-Division Multiple Access (SC-FDMA) symbols, Cyclic Prefix-Orthogonal Frequency Division Modulation (CP-OFDM) symbols, Pattern Division Multiple Access, or Polarization Division Multiple Access (PDMA) symbols, etc., particularly as needed in reality, although the embodiment of the invention will not be limited thereto.

In another possible implementation, the terminal encodes and/or rate-matches data information transmitted in the uplink shared channel, according to a second preset time-domain size, and duplicates or truncates the encoded and/or rate-matched data information according to the time-domain size of the uplink region, and maps the duplicated or truncated data information into the uplink region for transmission, or duplicates or truncates the encoded and/or rate-matched data information according to the time-domain size of the preset region, and maps the duplicated or truncated data information into the preset region for transmission.

Particularly when the same data (e.g., a transport block) are initially transmitted in an uplink shared channel, and retransmitted (due to an error in initial transmission) or transmitted repeatedly (for improved reception performance) in another uplink shared channel, the terminal only encodes and/or rate-matches the transport block according to a second preset time-domain size (where the second preset time-domain size can be a preset or preconfigured time resource size). The terminal transmits the uplink shared channel each time by duplicating or truncating the encoded and/or rate-matched information according to the time-domain size of the uplink region in the time unit for transmitting the uplink shared channel (or the time-domain size of the preset or preconfigured region for transmitting data, in the uplink region) to thereby match the size of the information with the time-domain size of the uplink region (or the time-domain size of the preset or preconfigured region for transmitting data, in the uplink region).

In the embodiment of the invention, the second preset time-domain size can be represented as A1 number of symbols or B1 number of mini-slots, where A1 and B1 are integers more than or equal to 1.

By way of an example, the terminal always assumes a time resource of four symbols for encoding and/or rate-matching, so when the transport block is transmitted in an uplink shared channel for the first time, and an uplink region in a time unit for transmitting the uplink shared channel includes six symbols, the terminal can duplicate and map the encoded and/or rate-matched transport block into six symbols for transmission. When the transport block is transmitted in an uplink shared channel for the second time, and an uplink region in the time unit for transmitting the uplink shared channel includes two symbols, the terminal can duplicate and map the encoded and/or rate-matched transport block into two symbols for transmission.

(2) Second Implementation.

The terminal transmits an uplink shared channel without any corresponding scheduling signaling in an uplink region in a time unit for transmitting the uplink shared channel, according to a first preset time-domain size.

Here the first preset time-domain size can be a preset or preconfigured size of time-domain resource, and the first preset time-domain size can be represented as A2 number of symbols or B2 number of mini-slots, where A2 and B2 are integers more than or equal to 1. For example, the preset or preconfigured size of time-main resource (the first preset time-domain size) can be two symbols or one mini-slot.

In a particular implementation, the terminal always encodes and/or rate-matches data carried in the uplink shared channel according to the preset or preconfigured size of time-domain resource.

When the preset or preconfigured size of time-domain resource does not exceed the time-domain size of the uplink region, or does not exceed the time-domain size of the preset or preconfigured region for transmitting data, in the uplink region, the terminal maps the encoded and/or rate-matched data onto a preset time position in the uplink region, or the preset or preconfigured region for transmitting data, in the uplink region, where the preset time position is the preset or preconfigured size of time-domain resource in the uplink region, or the preset or preconfigured region for transmitting data, in the uplink region.

By way of an example, the preset time position can be a region satisfying the preset or preconfigured size of time-domain resource, starting with the first symbol in the uplink region, or the preset or preconfigured region for transmitting data, in the uplink region, or the preset time position can be the last region satisfying the preset or preconfigured size of time-domain resource, in the uplink region, or the preset or preconfigured region for transmitting data, in the uplink region, or of course, can alternatively be inconsecutive in the time domain.

In another example, the preset time position can be one of time-domain resources with the preset or preconfigured size of time resource in the uplink region, or the preset or preconfigured region for transmitting data, in the uplink region (that is, there are a plurality of preset time positions in the uplink region, or the preset or preconfigured region for transmitting data, in the uplink region, and the terminal can select itself one of the preset time positions for transmission).

When the preset or preconfigured size of time-domain resource exceeds the time-domain size of the uplink region, or the time-domain size of the preset or preconfigured region for transmitting data, in the uplink region, the terminal truncates the encoded and/or rate-matched data according to the time-domain size of the uplink region, and maps the data onto all the symbols in the uplink region, or the preset or preconfigured region for transmitting data, in the uplink region for transmission, or the terminal drops the current transmission directly.

In this case, no matter in whichever time unit the uplink shared channel is transmitted, the uplink shared channel is transmitted in a fixed number of symbols, and even if there may be different uplink regions in the different time units, then the same original information carried in the uplink shared channel will be transmitted again (e.g., retransmitted or transmitted repeatedly) each time without being encoded and/or rate-matched again.

Figure 3:
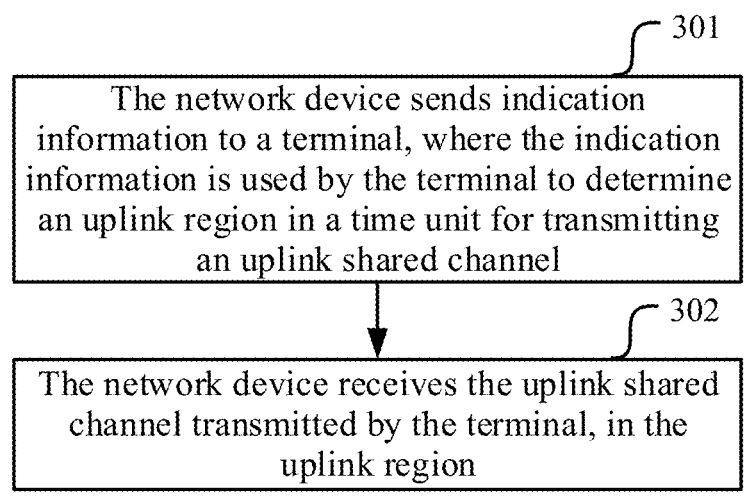
FIG. 3 is a schematic flow chart of a method for transmitting information according to a second embodiment of the invention.

FIG. 3 illustrates a schematic flow chart of a method for transmitting information according to another embodiment of the invention. As illustrated in FIG. 3, the method at a network device includes the following operations.

In the operation 301, the network device sends indication information to a terminal, where the indication information is used by the terminal to determine an uplink region in a time unit for transmitting an uplink shared channel.

In the operation 302, the network device receives the uplink shared channel transmitted by the terminal, in the uplink region.

In the embodiment of the invention, the network device sends the indication information to the terminal, so that the terminal determines a transmission resource of the uplink shared channel according to the indication information, and transmits the uplink shared channel over the transmission resource of the uplink shared channel, so that the network device can receive the uplink shared channel correctly.

It shall be noted that the method in the embodiment as illustrated in FIG. 3 corresponds to the method in the embodiment as illustrated in FIG. 2 except that the process performed by the terminal has been described in details in the embodiment as illustrated in FIG. 2, and the process performed by the network device will be described in details in the embodiment as illustrated in FIG. 3, so the embodiment as illustrated in FIG. 3 will be focused on the process performed by the network device, and reference can be made to the description in the embodiment as illustrated in FIG. 2 for details of their commonalities, so a repeated description thereof will be omitted here.

Particularly in the operation 301, the network device can send the indication information to the terminal in the time unit for transmitting the uplink shared channel, or a time unit before the time unit for transmitting the uplink shared channel.

The indication information can alternatively indicate a time-domain size and/or a time position of the uplink region in the time unit for transmitting the uplink shared channel.

The indication information can alternatively indicate an allocation of uplink and downlink resources in the time unit for transmitting the uplink shared channel, where the allocation of uplink and downlink resources particularly includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources particularly includes an uplink-downlink structure type in the time unit for transmitting the uplink shared channel, and the uplink-downlink structure type is at least one of all-uplink, all-downlink, and uplink-and-downlink structure types. The uplink-and-downlink structure type can further include uplink-majority and downlink-majority structure types.

The indication information is carried in higher-layer signaling, or carried in a broadcast channel or a downlink control channel; and/or the indication information is specific to the terminal, or shared by the terminal with the other terminals.

When the network device does not send the indication information, or fails to send the indication information, the network device does not receive any uplink transmission in the time unit, or the network device receives the uplink shared channel according to a preset or preconfigured size and/or position of time resource in the time unit.

When the time unit for transmitting the uplink shared channel is all-downlink, the network device does not receive any uplink transmission.

When the time unit for transmitting the uplink shared channel includes a downlink region and an uplink region, and a time unit after the time unit for transmitting the uplink shared channel is all-uplink, the network device receives separately transmitted uplink shared channels respectively in the time unit for transmitting the uplink shared channel, and the time unit after the time unit for transmitting the uplink shared channel, or receives one uplink shared channel in the time unit for transmitting the uplink shared channel, and the time unit after the time unit for transmitting the uplink shared channel, according to a prescription or a configuration.

The network device receives an uplink shared channel in the uplink region in two implementations which will be described below respectively.

(1) A first implementation corresponds to the first implementation at the terminal in the embodiment as illustrated in FIG. 2.

The network device receives an uplink data channel according to the time-domain size of an uplink region in a time unit for transmitting the uplink shared channel without any corresponding scheduling signaling, or the time-domain size of a preset or preconfigured region for transmitting data, in the uplink region.

In a particular implementation, in a possible implementation, the network device channel-decodes and/or rate-dematches data information transmitted in the uplink shared channel, according to the time-domain size of the uplink region, or the time-domain size of the preset region.

For example, the network device channel-decodes and/or rate-dematches the data information (regardless of initial transmission or retransmission) so that all the symbols in the uplink region, or all the symbols in the preset or preconfigured region for transmitting data, in the uplink region are used for transmitting the uplink shared channel.

In another possible implementation, the network device determines according to a second preset time-domain size, and the time-domain size of the uplink region, or the second preset time-domain size, and the time-domain size of the preset region that the encoded and/or rate-matched data information is duplicated or truncated by the terminal, and then merges duplicated parts of the data information transmitted in the uplink shared channel, or supplements bits in a truncated part thereof, and channel-decodes and/or rate-dematches the merged data information or the supplemented data information according to the second preset time-domain size.

For example, when the same data (e.g., a transport block) are initially transmitted in an uplink shared channel, and retransmitted (due to an error in initial transmission) or transmitted repeatedly (for improved reception performance) in another uplink shared channel, the network device only decodes and/or rate-dematches the transport block according to a preset or preconfigured time resource size, and receives each uplink shared channel transmission by determining according to the time-domain size of the uplink region in the time unit for transmitting the uplink shared channel (or the time-domain size of the preset or preconfigured region for transmitting data, in the uplink region), and the preset or preconfigured time resource size that the encoded and/or rate-matched information is duplicated or truncated by the terminal to thereby match the size of the information with the time-domain size of the uplink region (or the time-domain size of the preset or preconfigured region for transmitting data, in the uplink region), so that the network device can merge duplicated parts of the information in the time-domain size of the uplink region in the time unit for transmitting the uplink shared channel (or the time-domain size of the preset or preconfigured region for transmitting data, in the uplink region), or supplement bits in a truncated part thereof, in a reversible procedure to duplication or truncation by the terminal, and channel-decodes and/or rate-dematches the merged data information or the supplemented data information.

(2) A second implementation corresponds to the second implementation at the terminal in the embodiment as illustrated in FIG. 2.

The network device always receives an uplink shared channel in an uplink region in a time unit for transmitting the uplink shared channel without any corresponding scheduling signaling, according to a preset or preconfigured size of time resource.

In a particular implementation, the network device always decodes and/or rate-dematches data carried in the uplink shared channel according to the preset or preconfigured size of time-domain resource.

When the preset or preconfigured size of time-domain resource does not exceed the time-domain size of the uplink region, or does not exceed the time-domain size of the preset or preconfigured region for transmitting data, in the uplink region, the network device obtains information at a preset time position at a preset time position in the uplink region, or the preset or preconfigured region for transmitting data, in the uplink region, and decodes and/or rate-dematches the information, where the preset time position is the preset or preconfigured size of time-domain resource in the uplink region, or the preset or preconfigured region for transmitting data, in the uplink region.

By way of an example, the preset time position can be a region satisfying the preset or preconfigured size of time-domain resource, starting with the first symbol in the uplink region, or the preset or preconfigured region for transmitting data, in the uplink region, or the preset time position can be the last region satisfying the preset or preconfigured size of time-domain resource, in the uplink region, or the preset or preconfigured region for transmitting data, in the uplink region, or of course, can alternatively be inconsecutive in the time domain.

In another example, the preset time position can be one of time-domain resources with the preset or preconfigured size of time resource in the uplink region, or the preset or preconfigured region for transmitting data, in the uplink region (that is, there are a plurality of preset time positions in the uplink region, or the preset or preconfigured region for transmitting data, in the uplink region, and the terminal can select itself one of the preset time positions for transmission, so the network device needs to detect uplink shared channel transmission blindly at each time position).

When the preset or preconfigured size of time-domain resource exceeds the time-domain size of the uplink region, or the time-domain size of the preset or preconfigured region for transmitting data, in the uplink region, the network device determines that the terminal truncates the encoded and/or rate-matched data according to the time-domain size of the uplink region, and the network device receives the encoded information in all the symbols in the uplink region, or the preset or preconfigured region for transmitting data, in the uplink region, supplements bits of the encoded information, obtains the supplemented encoded information with the same length as the encoded information which was not truncated, and decodes and/or rate-dematches the supplemented encoded information; or the network device determines that the current transmission is dropped by the terminal, and does not receive any information.

It shall be noted that the time-domain size in the embodiment of the invention refers to the number of symbols or mini-slots or slots or sub-frames, and for example, the time-domain size is A number of symbols or B number of mini-slots or C number of slots or D number of sub-frames, where a mini-slot is defined as a time unit including X number of symbols, and X, A, B, C, and D are integers more than or equal to 1; and the time position refers to the index or the number of a symbol or mini-slot or a slot or a sub-frame.

The methods for transmitting information according to the embodiments of the invention will be described below in connection with a particular embodiment thereof.

Figure 4A:
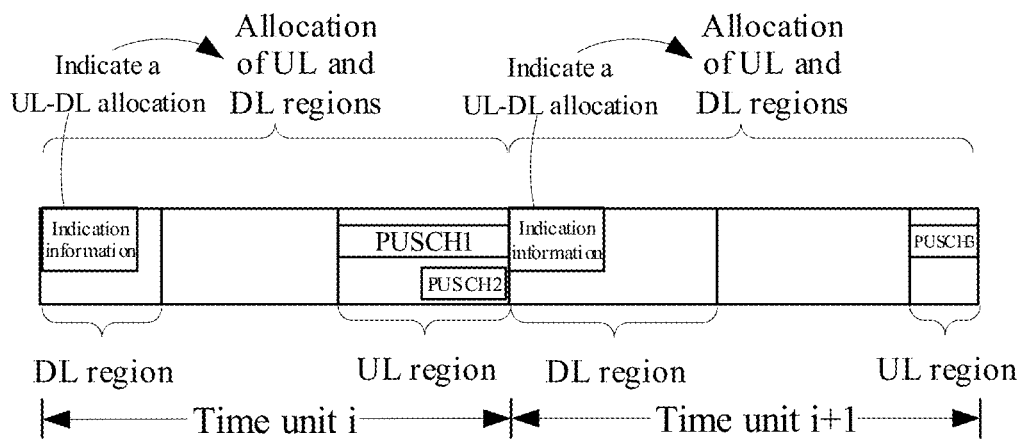
FIG. 4A is a schematic diagram of time units according to a third embodiment of the invention.
Figure 4B:
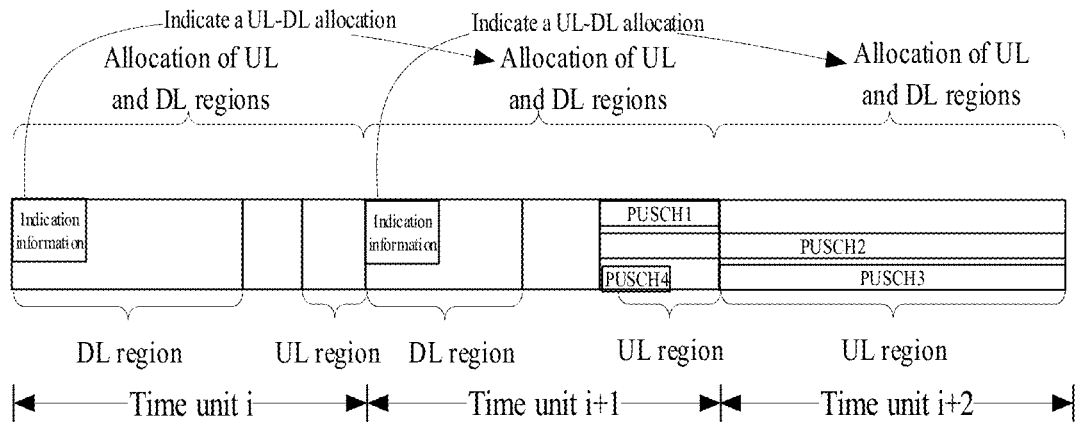
FIG. 4B is another schematic diagram of time units according to the third embodiment of the invention.

For example, a time unit is a slot including seven symbols (OFDM or SC-FDMA symbols). Of course, a time unit with another length can alternatively be defined. For example, indication information sent at a specific time-frequency position in the current time unit indicates an allocation of uplink and downlink regions in the current time unit (of course, the indication information may alternatively include only an uplink region) as illustrated in FIG. 4A; and for example, indication information sent at a specific time-frequency position in the current time unit indicates an allocation of uplink and downlink regions in the next time unit (of course, the indication information may alternatively include only an uplink region) as illustrated in FIG. 4B.

The embodiment will be described below from the perspective of the network device.

The network device determines the sizes of a downlink region and an uplink region allocated in a time unit i, and sends each piece of indication information at a specific time-frequency resource in the time unit i for sending the indication information to notify the allocation of the uplink and downlink regions in the time unit i, where two of the downlink region size, the uplink region size, and a GP size in the time unit i can be notified, or one or a plurality of preset uplink-downlink structure types can be notified.

For grant-free terminals, Physical Uplink Shared Channels (PUSCHs) transmitted by these terminals are detected blindly over time-domain and/or frequency-domain resources configured for the terminals, where a grant-free terminal can be only configured with a frequency resource, so a PUSCH can be transmitted over a time-domain resource in any uplink region; or the terminal can be configured with both a frequency-domain resource and a time-domain resource, and the time-domain resource can be configured so that grant-free transmission can be only performed in a part of time units, or grant-free transmission may be performed in each time unit; or the time-domain resource can be further configured so that a PUSCH is transmitted over a time resource with a preset or preconfigured fixed size in a time unit in which grant-free transmission can be performed, that is, as in the second implementation. At this time, as illustrated in FIG. 4A or FIG. 4B, for example, there are four symbols in a UL region in a time unit (i+1), that is, when a mini-slot including two symbols is defined, there are two mini-slots in a UL region; and if a PUSCH is preset to be always transmitted in two symbols, i.e., a mini-slot, then a PUSCH may be transmitted at two time-domain positions in the UL region, and the grant-free terminal to perform uplink transmission may select one of them for transmitting a PUSCH, e.g., a PUSCH2 in FIG. 4A, or a PUSCH4 in FIG. 4B, so the network device will detect the first two symbols, i.e., the first min-slot, and the last two symbols, i.e., the second mini-slot, respectively in the UL region blindly for a PUSCH. Of course, if a fixed size of time resource for transmitting a PUSCH is not configured or preseted for the grant-free terminal, then this will correspond to the first implementation, that is, a PUSCH may be transmitted in all the symbols in the UL region, e.g., a PUSCH1 and a PUSCH3 in FIG. 4A, and a PUSCH1, a PUSCH2, and a PUSCH3 in FIG. 4B, and the network device will detect all the symbols in the corresponding UL region blindly for a PUSCH.

An SPS PUSCH is received, in a time unit determined according to an SPS periodicity, over a frequency-domain resource indicated by a downlink control channel instructing the SPS resource to be activated, in the time unit (of course, a time resource can alternatively be indicated, so an SPS PUSCH is transmitted in a time unit determined according to an SPS periodicity, over a time resource with a preconfigured fixed size, that is, as in the second implementation; or if a size of time resource for each transmission is not indicated or preseted, then this will correspond to the first implementation).

For PHICH triggered PUSCH retransmission, the network device receives a PUSCH transmitted by the terminal, in a UL region in a corresponding time unit according to a timing relationship between a PHICH, and a PUSCH to be retransmitted (the network device can receive the PUSCH in all the symbols in the uplink region in the time unit as in the first implementation, or receive the PUSCH at a preconfigured or preset fixed symbol position).

For the PUSCH above, if it is determined for the time units that uplink regions in two adjacent time unit are consecutive, and for example, there are a downlink region and an uplink region in the time unit (i+1), and the time unit (i+2) is all-uplink, the network device may determine that PUSCHs are transmitted respectively in the uplink regions in the respective time units, that is, a PUSCH is not transmitted across the two time units, e.g., the PUSCH1 and the PUSCH3 in FIG. 4B, or a PUSCH can be transmitted in the uplink regions in the two time units, that is, a PUSCH can be transmitted across the two time units, e.g., the PUSCH2 in FIG. 4B, according to the prescription or the pre-configuration; and in this case, a specific transmission mechanism can be preseted between the terminal and the network device for consistent understanding at both sides.

The embodiment will be described below from the perspective of the terminal.

A specific time-frequency resource in each time unit for sending indication information is detected for indication information, and an allocation of uplink and downlink regions in the corresponding time unit is determined, and can be notified particularly in any one of the implementations described above for the network device side, as consistently preseted between the terminal and the network device.

For a grant-free terminal, the terminal with uplink data to be transmitted can select itself one of time-frequency resources configured for the terminal, for transmitting a PUSCH, where the grant-free terminal can be only configured with a frequency resource, so a PUSCH can be transmitted over a time resource in any uplink region; or the terminal can be configured with both a frequency resource and a time resource, and the time resource can be configured so that grant-free transmission can be only performed in a part of time units, or grant-free transmission may be performed in each time unit; or the time resource can be further configured so that a PUSCH is transmitted over a time resource with a preset or preconfigured fixed size in a time unit in which grant-free transmission can be performed, that is, as in the second implementation. At this time, as illustrated in FIG. 4A or FIG. 4B, for example, there are four symbols in a UL region in a time unit (i+1), that is, when a mini-slot including two symbols is defined, there are two mini-slots in a UL region; and if a PUSCH is preseted to be always transmitted in two symbols, i.e., a mini-slot, then a PUSCH may be transmitted at two time positions in the UL region, and the grant-free terminal to perform uplink transmission may select one of them for transmitting a PUSCH, e.g., a PUSCH2 in FIG. 4A, or a PUSCH4 in FIG. 4B. Of course, if a fixed size of time resource for transmitting a PUSCH is not configured or preseted for the grant-free terminal, then this will correspond to the first implementation, that is, a PUSCH may be transmitted in all the symbols in the UL region, e.g., a PUSCH1 and a PUSCH3 in FIG. 4A, and a PUSCH1, a PUSCH2, and a PUSCH3 in FIG. 4B.

An SPS PUSCH is transmitted, in a time unit determined according to an SPS periodicity, over a frequency-domain resource indicated by a downlink control channel instructing the SPS resource to be activated, in the time unit (of course, a time-domain resource can alternatively be indicated, so an SPS PUSCH is transmitted in a time unit determined according to an SPS periodicity, over a time-domain resource with a preconfigured fixed size, that is, as in the second implementation; or if a size of time-domain resource for each transmission is not indicated or preseted, then this will correspond to the first implementation).

For PHICH triggered PUSCH retransmission, a PUSCH is transmitted in a UL region in a corresponding time unit according to a timing relationship between a PHICH, and a PUSCH to be retransmitted (the PUSCH can be transmitted in all the symbols in the uplink region in the time unit as in the first implementation, or can be transmitted at a preconfigured or preset fixed symbol position).

For the PUSCH above, whether it can be transmitted across a plurality of time units can be preseted between the terminal and the network device, or determined according to configuration signaling, and it can be transmitted particularly in the same mechanism as described for the network device side.

In the embodiment above, a time unit can also indicate an allocation of uplink and downlink resources in a plurality of time units without departing from the scope of the invention, although a repeated description thereof will be omitted here.

For the method flows above, embodiments of the invention further provide a terminal and a network device, and reference can be made to the implementations above of the methods, so a repeated description thereof will be omitted here.

Figure 5:
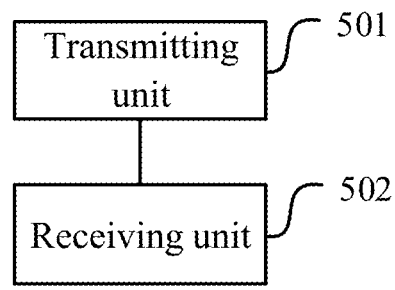
FIG. 5 is a schematic structural diagram of a terminal according to an embodiment of the invention.

FIG. 5 is a schematic structural diagram of a terminal according to an embodiment of the invention, where the terminal includes: a transmitting unit 501 and a receiving unit 502.

The receiving unit 502 is configured to receive indication information sent by a network device, where the indication information is used by the terminal to determine an uplink region in a time unit for transmitting an uplink shared channel; and the transmitting unit 501 is configured to transmit the uplink shared channel in the uplink region.

Optionally the transmitting unit 501 is configured to transmit the uplink shared channel in the uplink region according to the time-domain size of the uplink region, or the time-domain size of a preset region for transmitting data, in the uplink region, or to transmit the uplink shared channel in the uplink region according to a first preset time-domain size.

Optionally the transmitting unit 501 configured to transmit the uplink shared channel in the uplink region according to the time-domain size of the uplink region, or the time-domain size of the preset region for transmitting data, in the uplink region is configured: to encode and/or rate-match data information transmitted in the uplink shared channel according to the time-domain size of the uplink region, and to map the encoded and/or rate-matched data information into the uplink region for transmission; or to encode and/or rate-match data information transmitted in the uplink shared channel according to the time-domain size of the preset region, and to map the encoded and/or rate-matched data information into the uplink region for transmission; or to encode and/or rate-match data information transmitted in the uplink shared channel according to a second preset time-domain size, and to duplicate or truncate the encoded and/or rate-matched data information according to the time-domain size of the uplink region, and then map the duplicated or truncated data information into the uplink region for transmission; or to encode and/or rate-match data information transmitted in the uplink shared channel according to a second preset time-domain size, and to duplicate or truncate the encoded and/or rate-matched data information according to the time-domain size of the preset region, and then map the duplicated or truncated data information into the preset region for transmission.

Optionally the transmitting unit 501 configured to transmit the uplink shared channel in the uplink region according to the first preset time-domain size is configured: to encode and/or rate-match data information transmitted in the uplink shared channel according to the first preset time-domain size; when the first preset time-domain size does not exceed the time-domain size of the uplink region, or the time-domain size of the preset region, to map the encoded and/or rate-matched data information onto a time frequency corresponding to the first preset time-domain size in the uplink region or in the preset region for transmission; and when the first preset time-domain size exceeds the time-domain size of the uplink region, to truncate the encoded and/or rate-matched data information according to the time-domain size of the uplink region, and to map the truncated data information into the uplink region for transmission, or to drop transmission of the uplink shared channel, or when the first preset time-domain size exceeds the time-domain size of the preset region, to truncate the encoded and/or rate-matched data information according to the time-domain size of the preset region, and to map the truncated data information into the preset region for transmission, or to drop transmission of the uplink shared channel.

Optionally the receiving unit 502 configured to receive the indication information sent by the network device is configured to receive the indication information in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel; or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally when the receiving unit 502 does not receive the indication information, or fails to receive the indication information, the transmitting unit 501 does not perform any uplink transmission in the time unit, or the transmitting unit 501 transmits the uplink shared channel according to a preset or preconfigured size and/or position of time resource in the time unit; or when the receiving unit 502 determines according to the indication information that the time unit for transmitting the uplink shared channel is all-downlink, the transmitting unit 501 drops the current transmission.

When the receiving unit 502 determines according to the indication information that the time unit for transmitting the uplink shared channel includes a downlink region and an uplink region, and a time unit after the time unit for transmitting the uplink shared channel is all-uplink, the transmitting unit 501 transmits uplink shared channels separately in the time unit for transmitting the uplink shared channel, and the time unit after the time unit for transmitting the uplink shared channel respectively, or transmits an uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of a grant-free uplink shared channel, a semi-persistently scheduled uplink shared channel, and an uplink shared channel triggered by a PHICH to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

Figure 6:
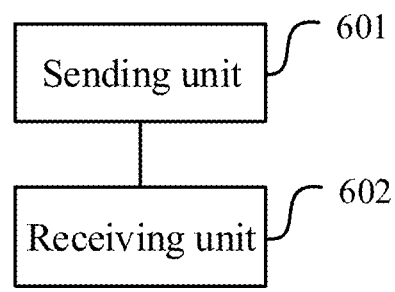
FIG. 6 is a schematic structural diagram of a network device according to an embodiment of the invention.

FIG. 6 is a schematic structural diagram of a network device according to an embodiment of the invention, where the network device includes: a sending unit 601 and a receiving unit 602.

The sending unit 601 is configured to send indication information to a terminal, where the indication information is used by the terminal to determine an uplink region in a time unit for transmitting an uplink shared channel; and the receiving unit 602 is configured to receive the uplink shared channel transmitted by the terminal, in the uplink region.

Optionally the receiving unit 602 configured to receive the uplink shared channel transmitted by the terminal, in the uplink region is configured: to receive the uplink shared channel in the uplink region according to the time-domain size of the uplink region, or the time-domain size of a preset region for transmitting data, in the uplink region, or to receive the uplink shared channel in the uplink region according to a first preset time-domain size.

Optionally the receiving unit 602 configured to receive the uplink shared channel in the uplink region according to the time-domain size of the uplink region, or the time-domain size of the preset region for transmitting data, in the uplink region is configured: to channel-decode and/or rate-dematch data information transmitted in the uplink shared channel, according to the time-domain size of the uplink region; or to channel-decode and/or rate-dematch data information transmitted in the uplink shared channel, according to the time-domain size of the preset region; or to determine according to a second preset time-domain size, and the time-domain size of the uplink region, or the second preset time-domain size, and the time-domain size of the preset region that encoded and/or rate-matched data information is duplicated or truncated by the terminal, to merge duplicated parts of the data information transmitted in the uplink shared channel, or to supplement bits in a truncated part thereof, and to channel-decode and/or rate-dematch the merged data information or the supplemented data information according to the second preset time-domain size.

Optionally the receiving unit 602 configured to receive the uplink shared channel in the uplink region according to the first preset time-domain size is configured: when the first preset time-domain size does not exceed the time-domain size of the uplink region, or the time-domain size of the preset region, to receive the uplink shared channel over a time-domain resource corresponding to the first preset time-domain size in the uplink region or the preset region, and to channel-decode and/or rate-dematch data information transmitted in the uplink shared channel according to the first preset time-domain size; and when the first preset time-domain size exceeds the time-domain size of the uplink region, or the time-domain size of the preset region, to receive the uplink shared channel in all the symbols occupied by the uplink region or the preset region, to supplement bits of data information transmitted in the uplink shared channel, and to channel-decode and/or rate-dematch the supplemented data information according to the first preset time-domain size.

Optionally the sending unit 601 configured to send the indication information to the terminal is configured to send the indication information to the terminal in the time unit for transmitting the uplink shared channel, or a time unit before the time unit for transmitting the uplink shared channel.

Optionally the indication information indicates a time-domain size and/or a time position of the uplink region in the time unit for transmitting the uplink shared channel, or the indication information indicates an allocation of uplink and downlink resources in the time unit for transmitting the uplink shared channel, where the allocation of uplink and downlink resources includes at least two of a downlink resource, an uplink resource, and a Guard Period (GP) resource, where the downlink resource includes the size and/or the position of a downlink region, the uplink resource includes the size and/or the position of an uplink region, and the GP resource includes the size and/or the position of a GP; or the allocation of uplink and downlink resources includes an uplink-downlink structure type in the time unit for transmitting the uplink shared channel, and the uplink-downlink structure type is at least one of all-uplink, all-downlink, and uplink-and-downlink structure types.

Optionally the uplink-and-downlink structure type includes uplink-majority and downlink-majority structure types.

Optionally when the sending unit 601 does not send the indication information, or fails to send the indication information, the receiving unit 602 does not receive any uplink transmission in the time unit, or the receiving unit 602 receives the uplink shared channel according to a preset or preconfigured size and/or position of time resource in the time unit; or when the time unit for transmitting the uplink shared channel is all-downlink, the receiving unit 602 does not receive any uplink transmission.

When the time unit for transmitting the uplink shared channel includes a downlink region and an uplink region, and a time unit after the time unit for transmitting the uplink shared channel is all-uplink, the receiving unit 602 receives separately transmitted uplink shared channels respectively in the time unit for transmitting the uplink shared channel, and the time unit after the time unit for transmitting the uplink shared channel, or receives one uplink shared channel in the time unit for transmitting the uplink shared channel, and the time unit after the time unit for transmitting the uplink shared channel, according to a prescription or a configuration.

Optionally the indication information is carried in higher-layer signaling, or carried in a broadcast channel or a downlink control channel; and/or the indication information is specific to the terminal, or shared by the terminal with the other terminals.

Optionally the uplink shared channel includes one or more of a grant-free uplink shared channel, a semi-persistently scheduled uplink shared channel, and an uplink shared channel triggered by a PHICH to be retransmitted.

Optionally the time unit is defined as a unit including D1 number of sub-frames or D2 number of slots or D3 number of mini-slots or D4 number of symbols, where D1, D2, D3, and D4 are integers more than or equal to 1.

Figure 7:
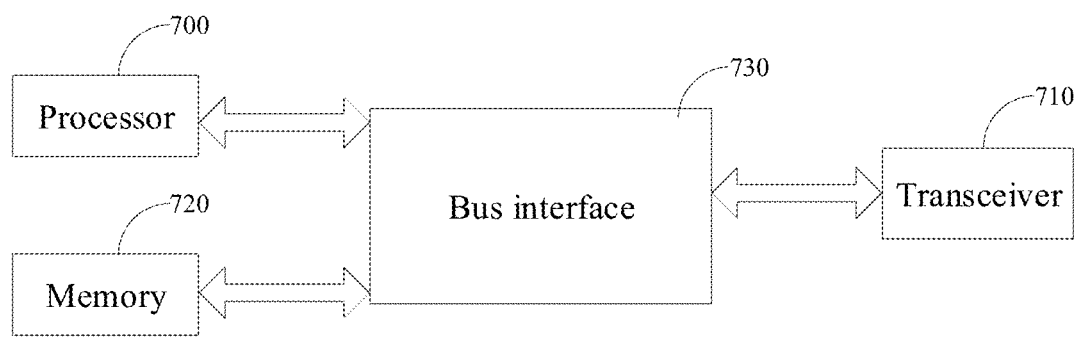
FIG. 7 is a schematic structural diagram of a device according to an embodiment of the invention.

Based upon the same technical idea, an embodiment of the invention further provides a device which can perform the functions at the terminal side in the embodiment above. As illustrated in FIG. 7, the device can include: a transceiver 710, and at least one processor 700 connected with the transceiver.

The processor 700 is configured to read and execute program in a memory 720: to receive indication information sent by a network device, through the transceiver 710, where the indication information is used by the terminal to determine an uplink region in a time unit for transmitting an uplink shared channel, and to transmit the uplink shared channel in the uplink region through the transceiver 710; and the transceiver 710 is configured to transmit and receive data under the control of the processor 700.

In FIG. 7, the bus architecture can include any number of interconnecting buses and bridges to link together various circuits including one or more processors represented by the processor 700, and one or more memories represented by the memory 720. The bus architecture can further link together various other circuits, e.g., a peripheral device, a manostat, a power management circuit, etc., all of which are well known in the art, so a further description thereof will be omitted in this context. The bus interface 730 serves as an interface. The transceiver 710 can be a number of elements, e.g., a number of transmitters and receivers, which are units for communication with various other devices over a transmission medium. The processor 700 is responsible for managing the bus architecture and performing normal processes, and can further provide various functions of timing, a peripheral interface, voltage regulation, power supply management, and other control functions. The memory 720 can store data for use by the processor 700 in performing the operations.

Optionally the processor 700 can be a Central Processing Unit (CPU), an Application Specific Integrated Circuit (ASIC), a Field-Programmable Gate Array (FPGA), or a Complex Programmable Logic Device (CPLD).

In the embodiment of the invention, the processor 700 reads and executes the program in the memory 720 to perform the method in the embodiment as illustrated in FIG. 2, and reference can be made to the description in the embodiment as illustrated in FIG. 2, so a repeated description thereof will be omitted here.

Figure 8:
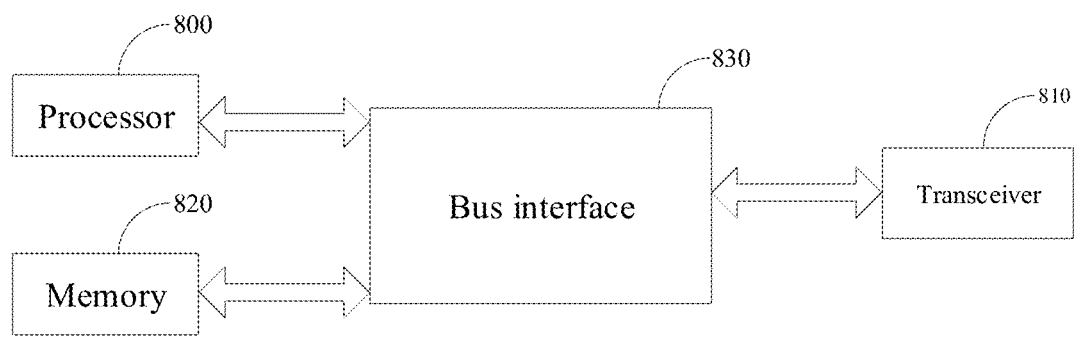
FIG. 8 is a schematic structural diagram of a device according to another embodiment of the invention.

Based upon the same technical idea, an embodiment of the invention further provides a device which can perform the functions at the network device side in the embodiment above. As illustrated in FIG. 8, the device can include: a transceiver 810, and at least one processor 800 connected with the transceiver.

The processor 800 is configured to read and execute a program in a memory 820: to send indication information to a terminal through the transceiver 810, where the indication information is used by the terminal to determine an uplink region in a time unit for transmitting an uplink shared channel; and to receive the uplink shared channel transmitted by the terminal, in the uplink region through the transceiver 810; and the transceiver 810 is configured to transmit and receive data under the control of the processor 800.

In FIG. 8, the bus architecture can include any number of interconnecting buses and bridges to link together various circuits including one or more processors represented by the processor 800, and one or more memories represented by the memory 820. The bus architecture can further link together various other circuits, e.g., a peripheral device, a manostat, a power management circuit, etc., all of which are well known in the art, so a further description thereof will be omitted in this context. The bus interface 830 serves as an interface. The transceiver 810 can be a number of elements, e.g., a number of transmitters and receivers, which are units for communication with various other devices over a transmission medium. The processor 800 is responsible for managing the bus architecture and performing normal processes, and can further provide various functions of timing, a peripheral interface, voltage regulation, power supply management, and other control functions. The memory 820 can store data for use by the processor 800 in performing the operations.

Optionally the processor 800 can be a CPU, an ASIC, an FPGA, or a CPLD.

In the embodiment of the invention, the processor 800 reads and executes the program in the memory 820 to perform the method in the embodiment as illustrated in FIG. 3, and reference can be made to the description in the embodiment as illustrated in FIG. 3, so a repeated description thereof will be omitted here.

An embodiment of the invention further provides a computer readable storage medium storing computer executable instructions configured to cause the computer to perform the functions at the terminal side in the embodiment above.

An embodiment of the invention further provides a computer readable storage medium storing computer executable instructions configured to cause the computer to perform the functions at the network device side in the embodiment above.

As can be apparent from the description above, in the embodiments above of the invention, a terminal receives indication information sent by a network device, where the indication information is used by the terminal to determine an uplink region in a time unit for transmitting an uplink shared channel; and the terminal transmits the uplink shared channel in the uplink region. Apparently the terminal receives the indication information sent by the network device, and determines a transmission resource of the uplink shared channel according to the indication information, so that the uplink shared channel can be transmitted correctly.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting information, the method comprising:
   receiving, by a terminal, indication information sent by a network device, wherein the indication information is used by the terminal to determine an uplink region in a time unit for transmitting an uplink shared channel; and
   transmitting, by the terminal, the uplink shared channel in the uplink region;
   wherein the uplink shared channel is an uplink shared channel without corresponding scheduling signaling;
   wherein the transmitting, by the terminal, the uplink shared channel in the uplink region comprises:
   transmitting, by the terminal, the uplink shared channel in the uplink region according to a time-domain size of the uplink region, or a time-domain size of a preset region for transmitting data, in the uplink region; or transmitting, by the terminal, the uplink shared channel in the uplink region according to a first preset time-domain size;

wherein the transmitting, by the terminal, the uplink shared channel in the uplink region according to the time-domain size of the uplink region, or the time-domain size of the preset region for transmitting data, in the uplink region comprises:

encoding and/or rate-matching, by the terminal, data information transmitted in the uplink shared channel according to the time-domain size of the uplink region, and mapping the encoded and/or rate-matched data information into the uplink region for transmission; or encoding and/or rate-matching, by the terminal, data information transmitted in the uplink shared channel according to the time-domain size of the preset region, and mapping the encoded and/or rate-matched data information into the preset region for transmission; or encoding and/or rate-matching, by the terminal, data information transmitted in the uplink shared channel according to a second preset time-domain size, and duplicating or truncating the encoded and/or rate-matched data information according to the time-domain size of the uplink region, and then mapping the duplicated or truncated data information into the uplink region for transmission; or encoding and/or rate-matching, by the terminal, data information transmitted in the uplink shared channel according to a second preset time-domain size, and duplicating or truncating the encoded and/or rate-matched data information according to the time-domain size of the preset region, and then mapping the duplicated or truncated data information into the preset region for transmission;

wherein the transmitting, by the terminal, the uplink shared channel in the uplink region according to the first preset time-domain size comprises:

encoding and/or rate-matching, by the terminal, data information transmitted in the uplink shared channel according to the first preset time-domain size;

when the first preset time-domain size does not exceed the time-domain size of the uplink region, or does not exceed the time-domain size of the preset region, mapping, by the terminal, the encoded and/or rate-matched data information onto a time-domain resource corresponding to the first preset time-domain size in the uplink region or in the preset region for transmission; and when the first preset time-domain size exceeds the time-domain size of the uplink region, truncating, by the terminal, the encoded and/or rate-matched data information according to the time-domain size of the uplink region, and mapping the truncated data information into the uplink region for transmission, or dropping transmission of the uplink shared channel, or when the first preset time-domain size exceeds the time-domain size of the preset region, truncating, by the terminal, the encoded and/or rate-matched data information according to the time-domain size of the preset region, and mapping the truncated data information into the preset region for transmission, or dropping transmission of the uplink shared channel.

2. The method according to claim 1, wherein the receiving, by the terminal, the indication information sent by the network device comprises:

receiving, by the terminal, the indication information in the time unit for transmitting the uplink shared channel, or a time unit before the time unit for transmitting the uplink shared channel.

3. The method according to claim 1, wherein the indication information indicates a time-domain size and/or a time position of the uplink region in the time unit for transmitting the uplink shared channel; or the indication information indicates an allocation of uplink and downlink resources in the time unit for transmitting the uplink shared channel, wherein the allocation of uplink and downlink resources comprises at least two of a downlink resource, an uplink resource, and a Guard Period (GP) resource, wherein the downlink resource comprises a size and/or a position of a downlink region, the uplink resource comprises a size and/or a position of the uplink region, and the GP resource comprises a size and/or a position of a GP; or the allocation of uplink and downlink resources comprises an uplink-downlink structure type in the time unit for transmitting the uplink shared channel, wherein the uplink-downlink structure type is at least one of all-uplink, all-downlink, and uplink-and-downlink structure types;

wherein the uplink-and-downlink structure type comprises uplink-majority and downlink-majority structure types.

4. The method according to claim 1, wherein transmitting, by the terminal, the uplink shared channel in the uplink region comprises:

when the terminal determines according to the indication information that the time unit for transmitting the uplink shared channel comprises a downlink region and an uplink region, and a time unit after the time unit for transmitting the uplink shared channel is all-uplink, transmitting, by the terminal, uplink shared channels separately in the time unit for transmitting the uplink shared channel, and the time unit after the time unit for transmitting the uplink shared channel respectively, or transmitting one uplink shared channel in the time unit for transmitting the uplink shared channel, and the time unit after the time unit for transmitting the uplink shared channel, according to a prescription or a configuration; or when the terminal does not receive the indication information, or fails to receive the indication information, performing, by the terminal, no uplink transmission in the time unit, or transmitting, by the terminal, the uplink shared channel according to a preset or preconfigured size and/or position of time resource in the time unit; or when the terminal determines according to the indication information that the time unit for transmitting the uplink shared channel is all-downlink, dropping, by the terminal, the current transmission.

5. The method according to claim 1, wherein the indication information is carried in higher-layer signaling, or carried in a broadcast channel or a downlink control channel; and/or the indication information is specific to the terminal, or shared by the terminal with the other terminals; and/or wherein the uplink shared channel comprises one or more of:

a grant-free uplink shared channel;

a semi-persistently scheduled uplink shared channel; and an uplink shared channel triggered by a Physical Hybrid Automatic Repeat Request (ARQ) Indicator Channel (PHICH) to be retransmitted;
and/or
wherein the time unit is defined as a unit comprising D1 number of sub-frames or D2 number of slots or D3 number of mini-slots or D4 number of symbols, wherein D1, D2, D3, and D4 are integers more than or equal to 1.

6. A method for transmitting information, the method comprising:
sending, by a network device, indication information to a terminal, wherein the indication information is used by the terminal to determine an uplink region in a time unit for transmitting an uplink shared channel; and
receiving, by the network device, the uplink shared channel transmitted by the terminal, in the uplink region;
wherein the uplink shared channel is an uplink shared channel without corresponding scheduling signaling;
wherein the receiving, by the network device, the uplink shared channel transmitted by the terminal, in the uplink region comprises:
receiving, by the network device, the uplink shared channel in the uplink region according to a time-domain size of the uplink region, or a time-domain size of a preset region for transmitting data, in the uplink region; or
receiving, by the network device, the uplink shared channel in the uplink region according to a first preset time-domain size;
wherein the receiving, by the network device, the uplink shared channel in the uplink region according to the time-domain size of the uplink region, or the time-domain size of the preset region for transmitting data, in the uplink region comprises:
channel-decoding and/or rate-dematching, by the network device, data information transmitted in the uplink shared channel, according to the time-domain size of the uplink region; or
channel-decoding and/or rate-dematching, by the network device, data information transmitted in the uplink shared channel, according to the time-domain size of the preset region; or
determining, by the network device, according to a second preset time-domain size, and the time-domain size of the uplink region, or the second preset time-domain size, and the time-domain size of the preset region that encoded and/or rate-matched data information is duplicated or truncated by the terminal, and then merging duplicated parts of the data information transmitted in the uplink shared channel, or supplementing bits in a truncated part thereof, and channel-decoding and/or rate-dematching the merged data information or the supplemented data information according to the second preset time-domain size;
wherein the receiving, by the network device, the uplink shared channel in the uplink region according to the first preset time-domain size comprises:
when the first preset time-domain size does not exceed the time-domain size of the uplink region, or does not exceed the time-domain size of the preset region, receiving, by the network device, the uplink shared channel over a time-domain resource corresponding to the first preset time-domain size in the uplink region or the preset region, and channel-decoding and/or rate-dematching data information transmitted in the uplink shared channel according to the first preset time-domain size; and when the first preset time-domain size exceeds the time-domain size of the uplink region, or the time-domain size of the preset region, receiving, by the network device, the uplink shared channel in all the symbols occupied by the uplink region or the preset region, supplementing bits of data information transmitted in the uplink shared channel, and then channel-decoding and/or rate-dematching the supplemented data information according to the first preset time-domain size.

7. The method according to claim 6, wherein the sending, by the network device, the indication information to the terminal comprises:
sending, by the network device, the indication information to the terminal in the time unit for transmitting the uplink shared channel, or a time unit before the time unit for transmitting the uplink shared channel.

8. The method according to claim 6, wherein the indication information indicates a time-domain size and/or a time position of the uplink region in the time unit for transmitting the uplink shared channel; or
the indication information indicates an allocation of uplink and downlink resources in the time unit for transmitting the uplink shared channel, wherein the allocation of uplink and downlink resources comprises at least two of a downlink resource, an uplink resource, and a Guard Period (GP) resource, wherein the downlink resource comprises a size and/or a position of a downlink region, the uplink resource comprises a size and/or a position of the uplink region, and the GP resource comprises a size and/or a position of a GP; or
the allocation of uplink and downlink resources comprises an uplink-downlink structure type in the time unit for transmitting the uplink shared channel, wherein the uplink-downlink structure type is at least one of all-uplink, all-downlink, and uplink-and-downlink structure types;
wherein the uplink-and-downlink structure type comprises uplink-majority and downlink-majority structure types.

9. The method according to claim 6, wherein receiving, by the network device, the uplink shared channel transmitted by the terminal comprises:
when the time unit for transmitting the uplink shared channel comprises a downlink region and an uplink region, and a time unit after the time unit for transmitting the uplink shared channel is all-uplink, receiving, by the network device, separately transmitted uplink shared channels respectively in the time unit for transmitting the uplink shared channel, and the time unit after the time unit for transmitting the uplink shared channel, or receiving one uplink shared channel in the time unit for transmitting the uplink shared channel, and the time unit after the time unit for transmitting the uplink shared channel, according to a prescription or a configuration; or
when the network device does not send the indication information, or fails to send the indication information, receiving, by the network device, no uplink transmission in the time unit, or receiving, by the network device, the uplink shared channel according to a preset or preconfigured size and/or position of time resource in the time unit; or
when the time unit for transmitting the uplink shared channel is all-downlink, receiving, by the network device, no uplink transmission.

10. The method according to claim 6, wherein the indication information is carried in higher-layer signaling, or carried in a broadcast channel or a downlink control channel; and/or
the indication information is specific to the terminal, or shared by the terminal with the other terminals; and/or
wherein the uplink shared channel comprises one or more of:
a grant-free uplink shared channel;
a semi-persistently scheduled uplink shared channel; and
an uplink shared channel triggered by a Physical Hybrid Automatic Repeat Request (ARQ) Indicator Channel (PHICH) to be retransmitted;
and/or
wherein the time unit is defined as a unit comprising D1 number of sub-frames or D2 number of slots or D3 number of mini-slots or D4 number of symbols, wherein D1, D2, D3, and D4 are integers more than or equal to 1.

11. A device, comprising: a processor, a transceiver, and a memory, wherein:
the processor is configured to read and execute program in the memory: to receive indication information sent by a network device, through the transceiver, wherein the indication information is used by the terminal to determine an uplink region in a time unit for transmitting an uplink shared channel; and to transmit the uplink shared channel in the uplink region through the transceiver, wherein the uplink shared channel is an uplink shared channel without corresponding scheduling signaling; and
the transceiver is configured to receive and transmit data under the control of the processor;
wherein the processor is configured:
to transmit the uplink shared channel in the uplink region through the transceiver according to a time-domain size of the uplink region, or a time-domain size of a preset region for transmitting data, in the uplink region; or
to transmit the uplink shared channel in the uplink region through the transceiver according to a first preset time-domain size;
wherein the processor is configured:
to encode and/or rate-match data information transmitted in the uplink shared channel according to the time-domain size of the uplink region, to map the encoded and/or rate-matched data information into the uplink region, and to transmit the data information through the transceiver; or
to encode and/or rate-match data information transmitted in the uplink shared channel according to the time-domain size of the preset region, to map the encoded and/or rate-matched data information into the preset region, and to transmit the data information through the transceiver; or
to encode and/or rate-match data information transmitted in the uplink shared channel according to a second preset time-domain size, and to duplicate or truncate the encoded and/or rate-matched data information according to the time-domain size of the uplink region, and then map the duplicated or truncated data information into the uplink region, and to transmit the data information through the transceiver; or
to encode and/or rate-match data information transmitted in the uplink shared channel according to a second preset time-domain size, and to duplicate or truncate the encoded and/or rate-matched data information according to the time-domain size of the preset region, and then map the duplicated or truncated data information into the preset region, and to transmit the data information through the transceiver;
to encode and/or rate-match data information transmitted in the uplink shared channel according to the first preset time-domain size;
when the first preset time-domain size does not exceed the time-domain size of the uplink region, or does not exceed the time-domain size of the preset region, to map the encoded and/or rate-matched data information onto a time-domain resource corresponding to the first preset time-domain size in the uplink region or in the preset region for transmission, and to transmit the data information through the transceiver; and
when the first preset time-domain size exceeds the time-domain size of the uplink region, to truncate the encoded and/or rate-matched data information according to the time-domain size of the uplink region, to map the truncated data information into the uplink region, and to transmit the data information through the transceiver, or to drop transmission of the uplink shared channel, or when the first preset time-domain size exceeds the time-domain size of the preset region, to truncate the encoded and/or rate-matched data information according to the time-domain size of the preset region, to map the truncated data information into the preset region, and to transmit the data information through the transceiver, or to drop transmission of the uplink shared channel.

12. The device according to claim 11, wherein the processor is configured:
to receive the indication information in the time unit for transmitting the uplink shared channel, or a time unit before the time unit for transmitting the uplink shared channel through the transceiver.

13. The device according to claim 11, wherein the indication information indicates a time-domain size and/or a time position of the uplink region in the time unit for transmitting the uplink shared channel; or
the indication information indicates an allocation of uplink and downlink resources in the time unit for transmitting the uplink shared channel, wherein the allocation of uplink and downlink resources comprises at least two of a downlink resource, an uplink resource, and a Guard Period (GP) resource, wherein the downlink resource comprises a size and/or a position of a downlink region, the uplink resource comprises a size and/or a position of the uplink region, and the GP resource comprises a size and/or a position of a GP; or
the allocation of uplink and downlink resources comprises an uplink-downlink structure type in the time unit for transmitting the uplink shared channel, wherein the uplink-downlink structure type is at least one of all-uplink, all-downlink, and uplink-and-downlink structure types;
wherein the uplink-and-downlink structure type comprises uplink-majority and downlink-majority structure types.

14. The device according to claim 11, wherein the processor is configured:
when it is determined according to the indication information that the time unit for transmitting the uplink shared channel comprises a downlink region and an uplink region, and a time unit after the time unit for transmitting the uplink shared channel is all-uplink, to transmit uplink shared channels separately in the time unit for transmitting the uplink shared channel, and the time unit after the time unit for transmitting the uplink shared channel respectively through the transceiver, or to transmit one uplink shared channel in the time unit for transmitting the uplink shared channel, and the time unit after the time unit for transmitting the uplink shared channel, through the transceiver, according to a prescription or a configuration; or when the indication information is not received or fails to be received through the transceiver, to perform no uplink transmission in the time unit, or to transmit the uplink shared channel through the transceiver according to a preset or preconfigured size and/or position of time resource in the time unit; or when it is determined according to the indication information that the time unit for transmitting the uplink shared channel is all-downlink, to drop the current transmission.

15. The device according to claim 11, wherein the indication information is carried in higher-layer signaling, or carried in a broadcast channel or a downlink control channel; and/or the indication information is specific to the terminal, or shared by the terminal with the other terminals; and/or wherein the uplink shared channel comprises one or more of:

a grant-free uplink shared channel;

a semi-persistently scheduled uplink shared channel; and an uplink shared channel triggered by a Physical Hybrid Automatic Repeat Request (ARQ) Indicator Channel (PHICH) to be retransmitted and/or wherein the time unit is defined as a unit comprising D1 number of sub-frames or D2 number of slots or D3 number of mini-slots or D4 number of symbols, wherein D1, D2, D3, and D4 are integers more than or equal to 1.

16. A device, comprising: a processor, a transceiver, and a memory, wherein:

the processor is configured to read and execute program in the memory: to send indication information to a terminal through the transceiver, wherein the indication information is used by the terminal to determine an uplink region in a time unit for transmitting an uplink shared channel; and to receive the uplink shared channel transmitted by the terminal, in the uplink region through the transceiver, wherein the uplink shared channel is an uplink shared channel without corresponding scheduling signaling; and the transceiver is configured to transmit and receive data under the control of the processor;

wherein the processor is configured:

to receive the uplink shared channel in the uplink region through the transceiver according to a time-domain size of the uplink region, or a time-domain size of a preset region for transmitting data, in the uplink region; or to receive the uplink shared channel in the uplink region through the transceiver according to a first preset time-domain size;

wherein the processor is configured:

to channel-decode and/or rate-dematch data information transmitted in the uplink shared channel, according to the time-domain size of the uplink region; or to channel-decode and/or rate-dematch data information transmitted in the uplink shared channel, according to the time-domain size of the preset region; or to determine according to a second preset time-domain size, and the time-domain size of the uplink region, or the second preset time-domain size, and the time-domain size of the preset region that encoded and/or rate-matched data information is duplicated or truncated, to merge duplicated parts of the data information transmitted in the uplink shared channel, or to supplement bits in a truncated part thereof, and to channel-decode and/or rate-dematch the merged data information or the supplemented data information according to the second preset time-domain size;

when the first preset time-domain size does not exceed the time-domain size of the uplink region, or does not exceed the time-domain size of the preset region, to receive the uplink shared channel over a time-domain resource corresponding to the first preset time-domain size in the uplink region or the preset region, and to channel-decode and/or rate-dematch data information transmitted in the uplink shared channel according to the first preset time-domain size; and when the first preset time-domain size exceeds the time-domain size of the uplink region, or the time-domain size of the preset region, to receive the uplink shared channel in all the symbols occupied by the uplink region or the preset region, to supplement bits of data information transmitted in the uplink shared channel, and to channel-decode and/or rate-dematch the supplemented data information according to the first preset time-domain size.

17. The device according to claim 16, wherein the processor is configured:

to send the indication information to the terminal through the transceiver in the time unit for transmitting the uplink shared channel, or a time unit before the time unit for transmitting the uplink shared channel.

18. The device according to claim 16, wherein the indication information indicates a time-domain size and/or a time position of the uplink region in the time unit for transmitting the uplink shared channel; or the indication information indicates an allocation of uplink and downlink resources in the time unit for transmitting the uplink shared channel, wherein the allocation of uplink and downlink resources comprises at least two of a downlink resource, an uplink resource, and a Guard Period (GP) resource, wherein the downlink resource comprises a size and/or a position of a downlink region, the uplink resource comprises a size and/or a position of the uplink region, and the GP resource comprises a size and/or a position of a GP; or the allocation of uplink and downlink resources comprises an uplink-downlink structure type in the time unit for transmitting the uplink shared channel, wherein the uplink-downlink structure type is at least one of all-uplink, all-downlink, and uplink-and-downlink structure types;

wherein the uplink-and-downlink structure type comprises uplink-majority and downlink-majority structure types.

19. The device according to claim 16, wherein the processor is configured:

when the time unit for transmitting the uplink shared channel comprises a downlink region and an uplink region, and a time unit after the time unit for transmitting the uplink shared channel is all-uplink, to receive separately transmitted uplink shared channels respectively in the time unit for transmitting the uplink shared channel, and the time unit after the time unit for transmitting the uplink shared channel through the transceiver, or to receive one uplink shared channel through the transceiver in the time unit for transmitting the uplink shared channel, and the time unit after the time unit for transmitting the uplink shared channel, according to a prescription or a configuration; or when the indication information is not sent or fails to be sent by the terminal, to receive no uplink transmission in the time unit, or to receive the uplink shared channel by the terminal according to a preset or preconfigured size and/or position of time resource in the time unit; or when the time unit for transmitting the uplink shared channel is all-downlink, to receive no uplink transmission.

20. The device according to claim 16, wherein the indication information is carried in higher-layer signaling, or carried in a broadcast channel or a downlink control channel; and/or the indication information is specific to the terminal, or shared by the terminal with the other terminals;

and/or wherein the uplink shared channel comprises one or more of:

a grant-free uplink shared channel;

a semi-persistently scheduled uplink shared channel; and an uplink shared channel triggered by a Physical Hybrid Automatic Repeat Request (ARQ) Indicator Channel (PHICH) to be retransmitted;

and/or wherein the time unit is defined as a unit comprising D1 number of sub-frames or D2 number of slots or D3 number of mini-slots or D4 number of symbols, wherein D1, D2, D3, and D4 are integers more than or equal to 1.

* * * * *